(12) United States Patent
Lee et al.

(10) Patent No.: US 12,508,621 B2
(45) Date of Patent: Dec. 30, 2025

(54) DUAL SLOT DIE COATER

(71) Applicant: LG Energy Solution, Ltd., Seoul (KR)

(72) Inventors: Taek-Soo Lee, Daejeon (KR); Min-Kyu Kang, Daejeon (KR); Shin-Wook Jeon, Daejeon (KR); Young-Joon Jo, Daejeon (KR); Sang-Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 466 days.

(21) Appl. No.: 17/927,184

(22) PCT Filed: Sep. 23, 2021

(86) PCT No.: PCT/KR2021/012983
§ 371 (c)(1),
(2) Date: Nov. 22, 2022

(87) PCT Pub. No.: WO2022/065890
PCT Pub. Date: Mar. 31, 2022

(65) Prior Publication Data
US 2023/0211370 A1    Jul. 6, 2023

(30) Foreign Application Priority Data
Sep. 28, 2020 (KR) .................. 10-2020-0126045

(51) Int. Cl.
*B05C 5/02* (2006.01)
*B05C 9/06* (2006.01)
*H01M 4/04* (2006.01)

(52) U.S. Cl.
CPC .............. *B05C 5/0262* (2013.01); *B05C 9/06* (2013.01); *H01M 4/0404* (2013.01)

(58) Field of Classification Search
None
See application file for complete search history.

(56) References Cited

U.S. PATENT DOCUMENTS 6,410,094 B2 *  6/2002  Mandai .................. G03C 1/74
                                                    118/410
6,818,062 B2 * 11/2004  Tomaru ................ B05C 5/0254
                                                    118/123
(Continued)

FOREIGN PATENT DOCUMENTS

CN      103962265 A      8/2014
CN      109261438 A  *   1/2019  ............ B05C 13/02
(Continued)

OTHER PUBLICATIONS

Extended European Search Report including Written Opinion for Application No. 21872918.4 dated Nov. 29, 2023, pp. 1-9.
(Continued)

*Primary Examiner* — Jethro M. Pence
(74) *Attorney, Agent, or Firm* — Lerner David LLP (57) ABSTRACT

There is provided a dual slot die coater that is easy to adjust a coating gap and can control a widthwise deviation of coating gap. The dual slot die coater of the present disclosure includes a plate member including a lower plate, an intermediate plate positioned on the lower plate and an upper plate positioned on the intermediate plate, wherein a lower slot is formed between the intermediate plate and the lower plate, and an upper slot is formed between the upper plate and the intermediate plate; a block provided on a rear surface of the plate member, wherein the block can be separated from or coupled to the plate member, or integrally formed with at least one plate of the plate member; a first bolt to push at least one plate of the plate member from the block as the first bolt passes through the block; and a second bolt to pull the at least one plate of the plate member toward the block as the second bolt passes through the block.

14 Claims, 7 Drawing Sheets

(56) References Cited

U.S. PATENT DOCUMENTS

| | | | | |
|---|---|---|---|---|
| 7,018,474 | B2* | 3/2006 | Mandai | B05C 5/0254 118/410 |
| 7,615,175 | B2* | 11/2009 | Nelson | B05C 5/007 264/212 |
| 11,691,173 | B2* | 7/2023 | Lee | B05C 11/1002 118/300 |
| 11,764,345 | B2* | 9/2023 | Kim | B05C 5/0266 118/400 |
| 11,964,298 | B2* | 4/2024 | Seol | H01M 4/0404 |
| 12,053,796 | B2* | 8/2024 | Lee | H01M 4/0404 |
| 12,103,036 | B2* | 10/2024 | Lee | B05C 5/0262 |
| 12,134,107 | B2* | 11/2024 | Lee | B05C 5/0254 |
| 12,157,140 | B2* | 12/2024 | Lee | B05C 5/027 |
| 12,257,599 | B2* | 3/2025 | Lee | H01M 4/0404 |
| 2018/0250701 | A1 | 9/2018 | Kuenne | |
| 2019/0351446 | A1 | 11/2019 | Lee et al. | |
| 2022/0016665 | A1* | 1/2022 | Lee | B05C 5/0262 |
| 2023/0079707 | A1* | 3/2023 | Lee | H01M 4/139 118/407 |
| 2023/0085121 | A1* | 3/2023 | Lee | H01M 4/0404 239/592 |
| 2023/0127081 | A1* | 4/2023 | Lee | H01M 4/04 118/300 |
| 2023/0127571 | A1* | 4/2023 | Lee | H01M 4/139 429/209 |
| 2023/0133585 | A1* | 5/2023 | Lee | H01M 4/0404 |
| 2023/0158539 | A1* | 5/2023 | Lee | B05C 9/06 118/313 |
| 2023/0201861 | A1* | 6/2023 | Lee | H01M 10/0404 118/255 |
| 2023/0219112 | A1* | 7/2023 | Lee | B05C 5/0262 118/125 |
| 2023/0249216 | A1* | 8/2023 | Lee | B05C 5/0254 118/125 |
| 2024/0033771 | A1* | 2/2024 | Lee | H01M 4/04 |
| 2024/0050975 | A1* | 2/2024 | Lee | B05C 5/0254 |
| 2024/0293837 | A1* | 9/2024 | Lee | H01M 4/366 |
| 2024/0382997 | A1* | 11/2024 | Park | B05C 5/02 |
| 2025/0041894 | A1* | 2/2025 | Lee | B05C 5/0254 |

FOREIGN PATENT DOCUMENTS

| | | |
|---|---|---|
| CN | 110049824 A | 7/2019 |
| JP | H06142588 A | 5/1994 |
| JP | H0838975 A | 2/1996 |
| JP | H10015461 A | 1/1998 |
| JP | 2000126627 A | 5/2000 |
| JP | 2006255646 A | 9/2006 |
| JP | 2019076811 A | 5/2019 |
| JP | 2019107606 A | 7/2019 |
| JP | 2019111470 A | 7/2019 |
| JP | 2019217453 A | 12/2019 |
| JP | 2020131084 A | 8/2020 |
| KR | 20040084013 A | 10/2004 |
| KR | 20200035642 A | 4/2020 |
| KR | 20200037662 A | 4/2020 |
| WO | 2020071713 A1 | 4/2020 |

OTHER PUBLICATIONS

International Search Report for Application No. PCT/KR2021/012983 mailed Dec. 21, 2021, pp. 1-3.

Search Report dated Jul. 10, 2025 from the Office Action for Chinese Application No. 202180034491.X issued Jul. 12, 2025, pp. 1-3.

* cited by examiner

FIG. 1

RELATED ART

FIG. 2

RELATED ART

DUAL SLOT DIE COATER

CROSS-REFERENCE TO RELATED APPLICATIONS

The present application is a national phase entry under 35 U.S.C. § 371 of International Application No. PCT/KR2021/012983, filed on Sep. 23, 2021, which claims priority from Korean Patent Application No. 10-2020-0126045 filed on Sep. 28, 2020, in the Republic of Korea, the disclosures of which are incorporated herein by reference.

TECHNICAL FIELD

The present disclosure relates to a dual slot die coater capable of simultaneously forming two or more layers by wetting, and more particularly, to a dual slot die coater having a means for controlling the widthwise coating gap deviation.

BACKGROUND ART

With the increasing technology development and the growing demand for mobile devices, the demand for secondary batteries as an energy source is rapidly increasing, and such secondary batteries essentially include an electrode assembly which is a power generation element. The electrode assembly includes a positive electrode, a separator and a negative electrode stacked at least once, and the positive electrode and the negative electrode are prepared by coating and drying a positive electrode active material slurry and a negative electrode active material slurry on a current collector made of an aluminum foil and a current collector made of a copper foil, respectively. For the uniform charging/discharging characteristics of the secondary batteries, it is necessary to uniformly coat the positive electrode active material slurry and the negative electrode active material slurry on the current collector, and slot die coaters have been used.

Figure 1:
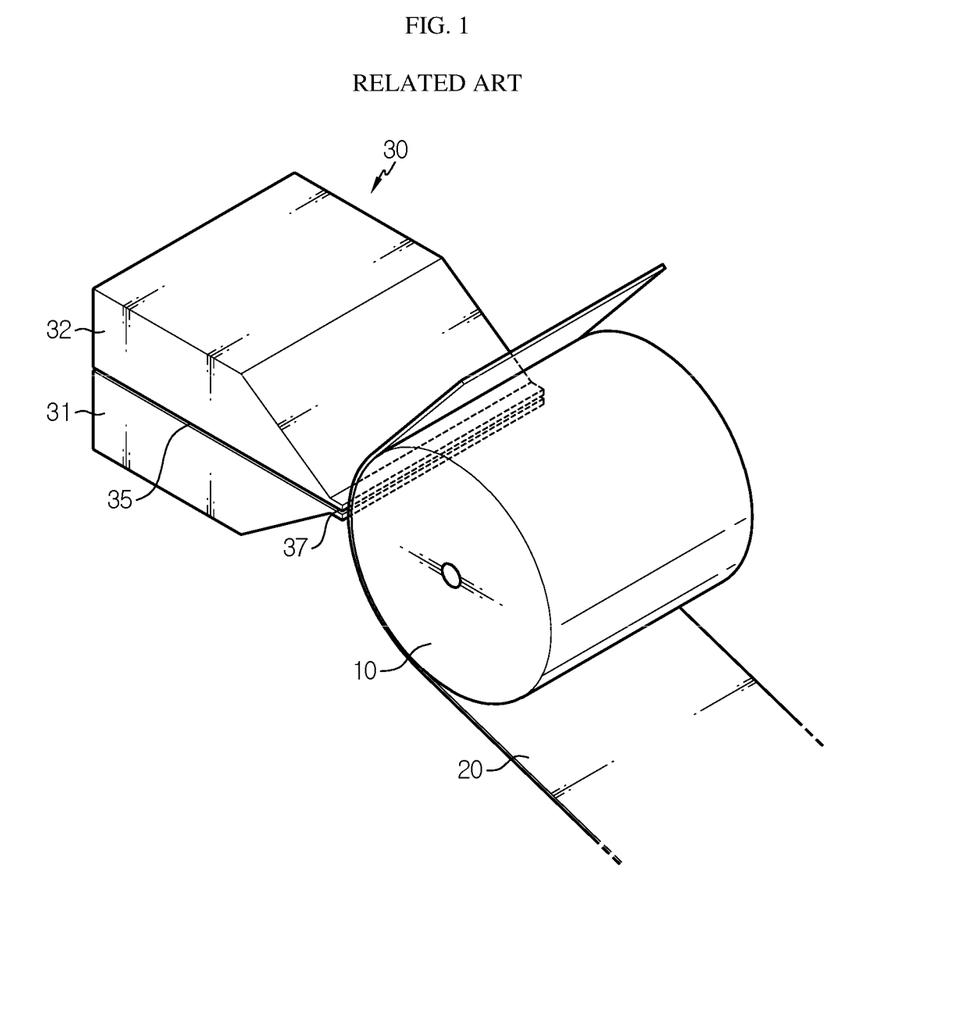
FIG. 1 is a schematic diagram showing an example of use of a slot die coater according to the conventional art.

FIG. 1 shows an example of a coating method using the conventional slot die coater.

Referring to FIG. 1, an electrode manufacturing method using the slot die coater includes coating an active material slurry issuing from a slot die coater 30 to a current collector 20 transferred by a coating roll 10. The active material slurry issuing from the slot die coater 30 is coated across one surface of the current collector 20 to form an active material layer. The slot die coater 30 includes two die blocks 31 and 32 and a slot 35 between the two die blocks 31 and 32, and may dispense one type of active material slurry through an exit port 37 in communication with the slot 35 to form a layer of electrode active material. Compared to bar coating or comma coating, the slot die coater achieves high-speed coating, and due to this advantage, it is widely applied from the perspective of high productivity.

To manufacture secondary batteries with high energy density, the thickness of the active material layer which was about 130 µm has gradually increased up to 300 µm. When the thick active material layer is formed with the conventional slot die coater 30, migration of a binder and a conductive material in the active material slurry gets more severe during drying, and thus a final electrode is manufactured non-uniformly. To solve this problem, when coating the active material layer at a small thickness and drying and repeating this process one on top of the other, it takes a long time to perform coating twice. To improve both electrode performance and productivity, a dual slot die coater capable of simultaneously coating two types of active material slurries is required.

Figure 2:
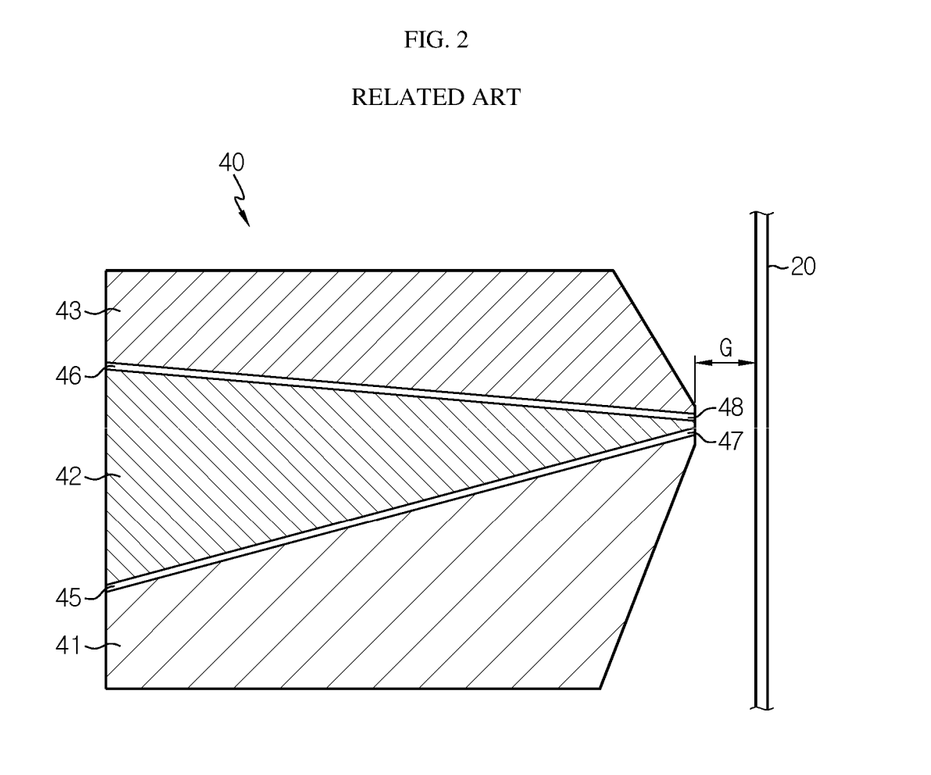
FIG. 2 is a schematic cross-sectional view of a dual slot die coater according to the conventional art.

FIG. 2 is a cross-sectional view of the conventional dual slot die coater taken along the movement direction (machine direction (MD)) of the current collector 20.

Referring to FIG. 2, the dual slot die coater 40 is configured by assembling three die blocks 41, 42, and 43. Slots are formed between the adjacent die blocks 41, 42 and 43, totaling two slots 45 and 46. Two types of active material slurries are simultaneously delivered on the current collector 20 through exit ports 47 and 48 in communication with the slots 45 and 46, respectively. Two active material layers may be simultaneously formed by continuously coating an additional active material slurry on an active material layer formed by a previously coated active material slurry.

Due to using the active material slurries simultaneously delivered from the different exit ports 47 and 48, the process using the dual slot die coater 40 is quite difficult to form each active material layer to a desired thickness.

The distance G from the exit ports 47, 48 to the surface of the current collector 20 is a coating gap, and is a very important variable in determining the coating quality of the active material layer. In general, the thickness of each active material layer is affected by the amount of the active material slurry delivered through the exit ports 47, 48, the type of the active material slurry and the coating gap. Additionally, when the coating gap is uniform in the widthwise direction (TD direction) of the current collector, stable coating is achieved, and a widthwise coating gap deviation greatly affects the coating width and uncoated region boundary shape. The thickness of the active material layer is a very small value of a few tens to a few hundreds of µm, and even a few µm change greatly affects the coating quality, so very strict management is required, and to stably perform uniform coating in the widthwise direction of the current collector, it is necessary to manage very strictly to achieve uniform dimensional precision in the widthwise direction. However, when the dual slot die coater 40 increases in width to use a wide current collector in order to increase the production amount, it is more difficult to achieve uniform coating in the widthwise direction, and accordingly precise control of the coating gap is more necessary.

In addition, an appropriate range of the coating gap is set according to the type of active material slurry. In the production process, many types of active material slurries, not one type of active material slurry, are used to produce various types of products. It is difficult to possess each dual slot die coater dedicated to each active material slurry to use various types of active material slurries. Accordingly, a type of active material slurry is coated using one dual slot die coater, and after the coating is completed, a different type of active material slurry is coated using the dual slot die coater, and at that time, it is necessary to change the previously set coating gap. In addition, since it is difficult to always uniformly prepare even the same type of active material slurry, there is dispersion in properties depending on when the slurry is prepared, so it is necessary to respond to the dispersion, and as the coating is performed faster, the coating quality deviation increases due to the dispersion of the properties of the active material slurry, and accordingly the coating gap control is more important.

To form a desired coating gap, the conventional art needs to repeat the task of testing the coating process a few times, disassembling and re-assembling each die block, adjusting the coating gap and checking. However, the coating gap is a variable that is adjusted so sensitively that the coating gap changes depending on the fastening strength of bolts used to assemble the die blocks 41, 42, and 43, and may be changed by a force used to pump the active material slurry. Since the slot die coater has the slot on the coupling surface of the die blocks, basically three die blocks 41, 42, and 43 are needed to include the two slots 45 and 46 like the dual slot die coater 40. To configure a device having a foot print and volume similar to the conventional slot die coater 30 including one slot, it is necessary to reduce the thickness of each of the die blocks 41, 42, and 43, and by this reason, inevitably, it is structurally vulnerable to deformation and torsion. When deformation or torsion occurs, the adjusted coating gap is changed, causing defects in the electrode process.

DISCLOSURE

Technical Problem

The present disclosure is designed to solve the above-described problem, and therefore the present disclosure is directed to providing a dual slot die coater that is easy to adjust a coating gap and can control a widthwise deviation of the coating gap.

However, the problems to be solved by the present disclosure are not limited to the above problems, and other problems that are not mentioned will be clearly understood by those skilled in the art from the description of the invention described below.

Technical Solution

To solve the above-described problem, a dual slot die coater of the present disclosure includes a plate member including a lower plate, an intermediate plate positioned on the lower plate and an upper plate positioned on the intermediate plate, wherein a lower slot is formed between the intermediate plate and the lower plate, and an upper slot is formed between the upper plate and the intermediate plate; a block provided on a rear surface of the plate member, wherein the block can be separated from or coupled to the plate member, or integrally formed with at least one plate of the plate member; a first bolt to push at least one plate of the plate member from the block as the first bolt passes through the block; and a second bolt to pull the at least one plate of the plate member toward the block as the second bolt passes through the block.

In the present disclosure, at least two first bolts and at least two second bolts are preferably provided on the rear surface of the plate member in a widthwise direction of the plate member, respectively.

The block may extend from the lower plate to the upper plate, and the intermediate plate and the lower plate may be fixed by the block, the first bolt may push the upper plate and the second bolt may pull the upper plate. In this instance, a length of the upper plate may be shorter than a length of the intermediate plate and a length of the lower plate.

In the present disclosure, the block may include a first block extending from the intermediate plate to the upper plate and a second block extending from the lower plate to the intermediate plate, the first bolt which pushes the upper plate and the second bolt which pulls the upper plate may pass through the first block, and the first bolt which pushes the intermediate plate and the second bolt which pulls the intermediate plate may pass through the second block.

Here, the first block may be fixed to the intermediate plate, and the second block may be fixed to the lower plate.

A length of the lower plate may be longer than a length of the intermediate plate and a length of the upper plate.

In the present disclosure, the lower plate, the intermediate plate and the upper plate may have a lower die lip, an intermediate die lip and an upper die lip, each forming a front end, respectively, a lower exit port in communication with the lower slot may be formed between the lower die lip and the intermediate die lip, an upper exit port in communication with the upper slot may be formed between the intermediate die lip and the upper die lip, the dual slot die coater may perform extrusion coating of an active material slurry on a surface of a continuously moving substrate through at least one of the lower slot or the upper slot, and a step may be formed between the lower exit port and the upper exit port.

In the present disclosure, the intermediate plate may include an intermediate upper plate and an intermediate lower plate provided in contact with each other in a vertical direction, wherein the intermediate upper plate and the intermediate lower plate make a relative movement by sliding along a contact surface, the intermediate upper plate may be fixed and coupled to the upper plate, and the intermediate lower plate may be fixed and coupled to the lower plate.

In the present disclosure, the first bolt may be fastened to the block such that a bolt leg faces the rear surface of the upper plate, when the first bolt is rotated in a direction, the bolt leg may move forward to the upper plate and the upper plate may be moved forward and spaced apart from the block by a pushing force of the first bolt, and when the first bolt is rotated in an opposite direction, the first bolt may move rearward and the bolt leg may be spaced apart from the rear surface of the upper plate.

The second bolt may be fastened to the block and the upper plate, and when the second bolt is rotated in a direction, the upper plate may be pulled toward the block and moved rearward.

The first bolt may move the upper plate forward as it rotates, to form a necessary spacing when moving the upper plate rearward using the second bolt, and the second bolt may move the upper plate rearward as it rotates, to form a necessary spacing when moving the upper plate forward using the first bolt.

A tensile force of the first bolt may be larger than a tensile force of the second bolt. The dual slot die coater may have a vertical die configuration in which the rear surfaces of the lower plate, the intermediate plate and the upper plate are bottom surfaces such that a delivery direction of the active material slurry is opposite to a direction of gravity.

The dual slot die coater may further include a first spacer interposed between the lower plate and the intermediate plate to adjust a width of the lower slot, and a second spacer interposed between the intermediate plate and the upper plate to adjust a width of the upper slot.

The lower plate may include a first manifold in which a first coating solution is received, the first manifold being in communication with the lower slot, and the intermediate plate may include a second manifold in which a second coating solution is received, the second manifold being in communication with the upper slot.

The lower slot and the upper slot may form an angle of 30° to 60°.

Advantageous Effects

According to the present disclosure, the first bolt pushes the plate member to move the plate member forward, and the second bolt pulls the plate member to move the plate member back. Additionally, the first bolt may ensure a spacing required for the second bolt to move the plate member back. The second bolt may ensure a spacing required for the first bolt to move the plate member forward. Accordingly, according to the present disclosure, there is no need to dissemble and re-assemble the plate members of the dual slot die coater which are structurally vulnerable due to their small thickness when adjusting the coating gap, and it is possible to maintain the uniform coating gap by simple manipulation of the first and second bolts.

According to the present disclosure, it is possible to maintain the uniform (±2%) coating gap, taking into account the deformation of the plate member by the pressure of the active material slurry coming out, thereby uniformly controlling the coating amount and the resultant coating quality. Accordingly, it is possible to obtain coated products, and in particular, electrodes for secondary batteries, with uniform quality by using the dual slot die coater having the uniform coating gap.

As described above, according to the present disclosure, even under the high pressure of the active material slurry coming out, it is possible to maintain the coating gap once it is adjusted. Accordingly, it is possible to ensure coating workability and reproducibility.

Using the dual slot die coater, it is possible to uniformly form a coating layer, in particular, an active material layer, to a desired thickness, and preferably, it is possible to simultaneously coat two types of active material slurries, thereby improving the performance and productivity.

In particular, the dual slot die coater may include a plurality of first bolts and a plurality of second bolts in the widthwise direction thereof, thereby achieving precise control without widthwise coating gap deviation.

An appropriate range of the coating gap is set according to the type of active material slurry. The present disclosure performs the process with a smaller or larger amount of rotation of the first and second bolts to make the step portion to have the suitable height, and thus there is no need to include each dual slot die coater dedicated to each active material slurry to use various types of active material slurries, and the dual slot die coater can be used for general purposes. Additionally, when there is dispersion in the active material slurry, it is possible to quickly respond to the dispersion by immediately adjusting the step.

As described above, when the dual slot die coater of the present disclosure is used to coat the active material slurry on the current collector while moving the current collector to manufacture an electrode of a secondary battery, it is possible to achieve uniform coating under high-speed or wide-scale coating conditions.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just some preferred embodiments of the present disclosure and do not fully describe the technical features of the present disclosure, so it should be understood that a variety of other equivalents and modifications could have been made thereto at the time of filing the patent application.

A dual slot die coater of the present disclosure is an apparatus including a lower slot and an upper slot to coat a coating solution in a double layer on a substrate. In the following description, the 'substrate' is a current collector, and the coating solution is an 'active material slurry'. Both a first coating solution and a second coating solution are active material slurries, and they may have the same or different compositions (types of an active material, a conductive material, and a binder), contents (an amount of each of the active material, the conductive material, and the binder) or properties. The dual slot die coater of the present disclosure is optimal for electrodes manufactured by simultaneous coating of two types of active material slurries or pattern coating by coating two types of active material slurries in an alternating manner. However, the scope of the present disclosure is not necessarily limited thereto. For example, the substrate may be a porous base that constitutes a separator, and the first coating solution and the second coating solution may be organics having different compositions or properties. That is, in case that thin film coating is required, the substrate, the first coating solution and the second coating solution are not limited to particular types.

Figure 3:
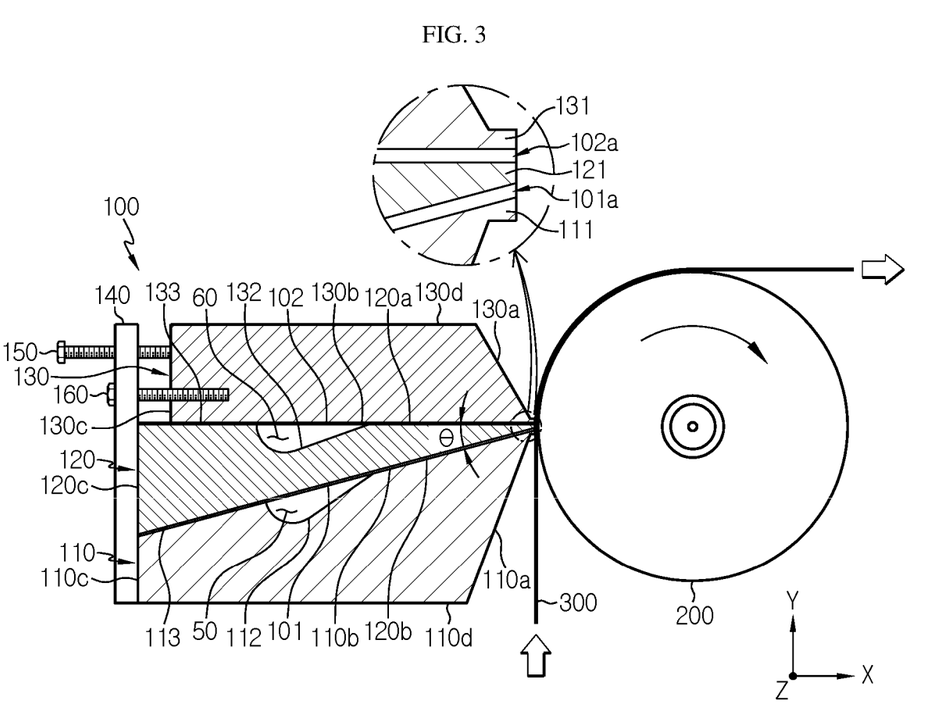
FIG. 3 is a schematic cross-sectional view of a dual slot die coater according to an embodiment of the present disclosure.
Figure 4:
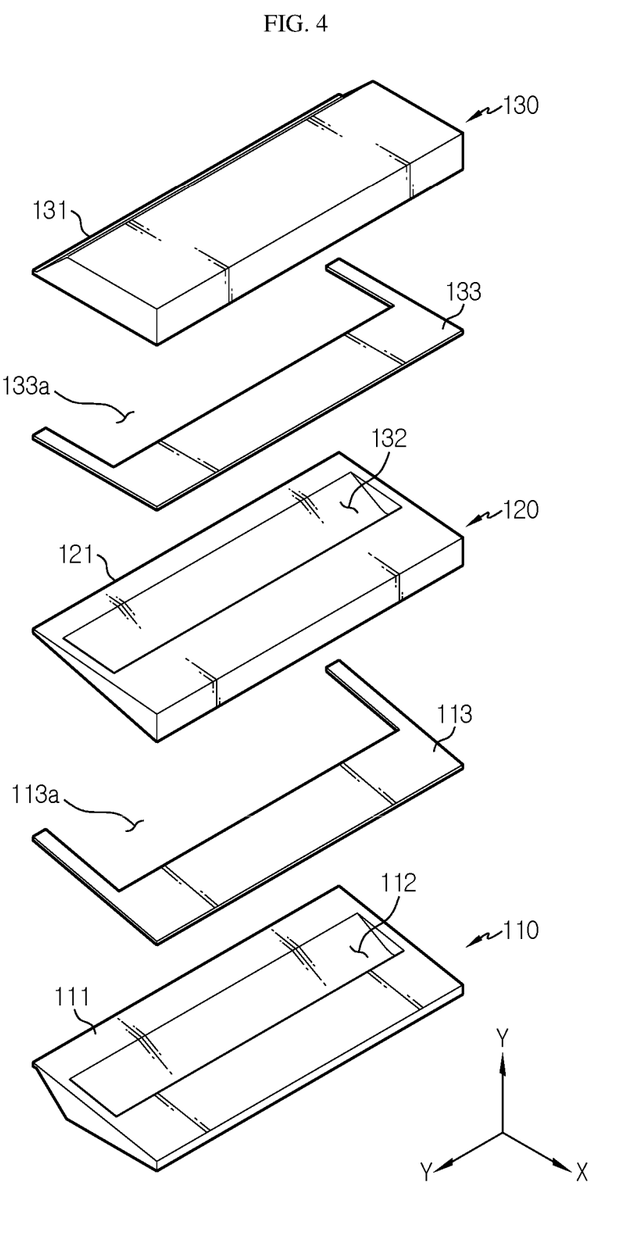
FIG. 4 is a schematic exploded perspective view of a dual slot die coater according to an embodiment of the present disclosure.
Figure 5:
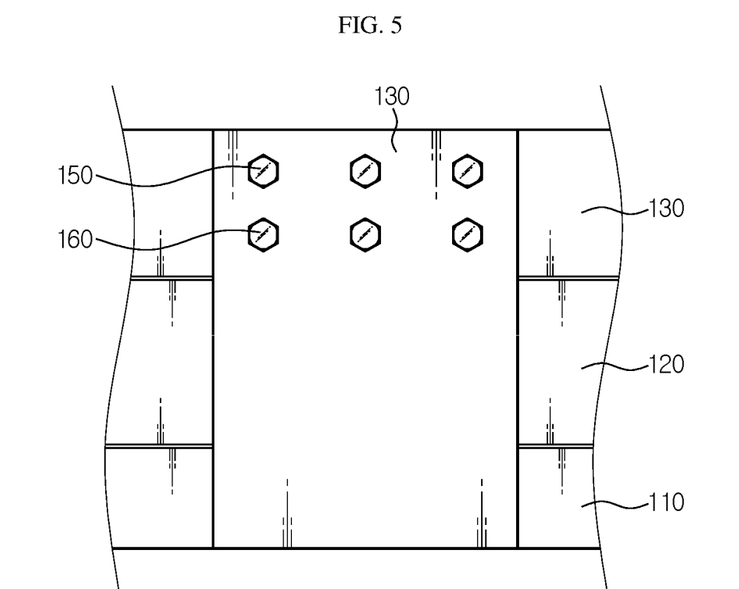
FIG. 5 is a rear view of the dual slot die coater shown in FIG. 3.

FIG. 3 is a schematic cross-sectional view of the dual slot die coater according to an embodiment of the present disclosure, and FIG. 4 is a schematic exploded perspective view of the dual slot die coater according to an embodiment of the present disclosure. FIG. 5 is a rear view of the dual-slot die coater shown in FIG. 3.

The dual slot die coater 100 according to the present disclosure is an apparatus including a lower slot 101 and an upper slot 102 to simultaneously or alternately coat a same type of coating solution or two different types of coating solutions on a substrate 300 through the lower slot 101 and the upper slot 102. Referring to FIGS. 3 and 4, the dual slot die coater 100 includes a plate member including a lower plate 110, an intermediate plate 120 positioned on or adjacent to the lower plate 110, and an upper plate 130 positioned on or adjacent to the intermediate plate 120. It is also noted that the lower plate 110 and the upper plate 130 may also be referred to as the first outer plate and the second outer plate, respectively, as they are each disposed outward relative to the intermediate plate 120.

In FIG. 3, the dual slot die coater 100 is installed such that the delivery direction (X direction) of the coating solution or the active material slurry is almost horizontal (approximately: ±5°).

The intermediate plate 120 is a die block disposed in the middle of the plate members of the dual slot die coater 100, and is a plate member interposed between the lower plate 110 and the upper plate 130 to form a dual slot. The intermediate plate 120 of this embodiment is a right triangle in cross section, but its shape is not necessarily limited thereto, and for example, the intermediate die block 120 may be an isosceles triangle in cross section.

A first surface 120a of the intermediate plate 120 facing the upper plate 130 is placed almost horizontally (but can optionally be horizontal), and a surface 130d (that is, a surface that forms the upper surface of the outer peripheral surface of the dual slot die coater 100) opposite a surface 130b of the upper plate 130 facing the first surface 120a is also placed almost horizontally (but can optionally be horizontal). As described above, the first surface 120a and the opposite surface 130d are almost parallel to each other (but can optionally be parallel). Additionally, a surface 110d (that is, a surface that forms the lower surface of the outer peripheral surface of the dual slot die coater 100) opposite a surface 110b of the lower plate 110 facing the intermediate plate 120 is also placed almost horizontally (but can optionally be horizontal), and this surface is a bottom surface 110d (X-Z plane).

The surfaces of the lower plate 110, the intermediate plate 120 and the upper plate 130 opposite the delivery direction of the active material slurry, i.e., rear surfaces 110c, 120c, and 130c, are placed almost vertically (Y direction).

Among the surfaces that form the outer peripheral surface of the dual slot die coater 100 in the lower plate 110 and the upper plate 130 on the outermost side, the bottom surface 110d of the lower plate 110 and the top surface 130d of the upper plate 130 may be almost perpendicular to the rear surfaces 110c and 130c (but can optionally be perpendicular).

Additionally, the first surface 120a of the intermediate plate 120 may be almost perpendicular to the rear surface 120c (but can optionally be perpendicular). In the plate members 110, 120, 130, since corners at which sides meet are right-angled, a right angle portion in cross section exists, and a vertical or horizontal surface may be used as a reference surface, and thus it is easy to manufacture or handle and it is possible to ensure precision. In addition, when combined together, the lower plate 110, the intermediate plate 120 and the upper plate 130 have approximately a cuboid shape as a whole, and have an inclined shape toward the substrate 300 only at the front side where the coating solution emerges (see the surface 130a of the upper plate 130, the surface 110a of the lower plate 110). The shape after assembly is approximately similar to that of a slot die coater including a single slot (for example, 30 of FIG. 1), so it is possible to share a slot die coater stand or the like.

The lower plate 110, the intermediate plate 120 and the upper plate 130 are not necessarily limited thereto, and for example, may be configured as a vertical die such that the delivery direction of the electrode active material slurry is an upward direction and the rear surfaces 110c, 120c, 130c are bottom surfaces.

The plate members 110, 120, 130 are made of, for example, a SUS material. Materials that are easy to process, such as SUS420J2, SUS630, SUS440C, SUS304, and SUS316L, may be used. The SUS is easy to process, inexpensive, has high corrosion resistance, and can be formed in a desired shape at low cost.

The lower plate 110 is the lowermost plate member among the plate members of the dual slot die coater 100, and the surface 110b facing the intermediate plate 120 is inclined at an angle of approximately 30° to 60° with respect to the bottom surface 110d.

The lower slot 101 may be formed at a location in which the lower plate 110 and the intermediate plate 120 face each other. For example, a first spacer 113 is interposed between the lower plate 110 and the intermediate plate 120 to form a gap between, and the lower slot 101 corresponding to a passage of flow of the first coating solution 50 may be formed. In this case, the thickness of the first spacer 113 determines the vertical width (Y-axis direction, a slot gap) of the lower slot 101.

As shown in FIG. 4, the first spacer 113 has a first opening portion 113a which is cut at an area, and may be interposed in the remaining portion except one side in the edge area of the facing surface of each of the lower plate 110 and the intermediate plate 120. Accordingly, a lower exit port 101a through which the first coating solution 50 emerges is only formed between the front end of the lower plate 110 and the front end of the intermediate plate 120. The front end of the lower plate 110 and the front end of the intermediate plate 120 are defined as a lower die lip 111 and an intermediate die lip 121, respectively, and in other words, the lower exit port 101a is formed at the spacing between the lower die lip 111 and the intermediate die lip 121.

For reference, the first spacer 113 acts as a gasket to prevent the leakage of the first coating solution 50 through the gap between the lower plate 110 and the intermediate plate 120 except the area where the lower exit port 101a is formed, and thus the first spacer 113 is preferably made of a material having sealing ability.

The lower plate 110 includes a first manifold 112 having a predetermined depth on the surface 110b facing the intermediate plate 120, and the first manifold 112 is in communication with the lower slot 101. The first manifold 112 is a space formed from the surface 110b of the lower plate 110 facing the intermediate plate 120 to the surface 110d opposite the surface 110b. The first manifold 112 is connected to a first coating solution supply chamber (not shown) provided outside with a supply pipe and is supplied with the first coating solution 50. When the first manifold 112 is fully filled with the first coating solution 50, the flow of the first coating solution 50 is guided along the lower slot 101 and comes out of the lower exit port 101a.

The upper plate 130 is positioned facing the first surface 120a which is the upper surface of the intermediate plate 120 which is parallel to the bottom surface. As described above, the upper slot 102 is formed at a location in which the intermediate plate 120 and the upper plate 130 face each other.

In the same way as the lower slot 101, a second spacer 133 may be interposed between the intermediate plate 120 and the upper plate 130 to form a gap therebetween. Accordingly, the upper slot 102 corresponding to a passage of flow of a second coating solution 60 is formed. In this case, a vertical width (Y-axis direction, a slot gap) of the upper slot 102 is determined by the second spacer 133.

In addition, in the similar way to the first spacer 113, the second spacer 133 has a second opening portion 133a which is cut at an angle, and may be interposed in the remaining portion except one side in the edge area of the facing surface of each of the intermediate plate 120 and the upper plate 130. Likewise, the circumferential direction except the front side of the upper slot 102 is blocked, and the upper exit port 102a is only formed between the front end of the intermediate plate 120 and the front end of the upper plate 130. The front end of the upper plate 130 is defined as an upper die lip 131, and in other words, the upper exit port 102a is formed at the spacing between the intermediate die lip 121 and the upper die lip 131.

In addition, the intermediate plate 120 includes a second manifold 132 having a predetermined depth on the surface 120a facing the upper plate 130 and the second manifold 132 is in communication with the upper slot 102. The intermediate plate 120 has a second surface 120b opposite the first surface 120a. The second surface 120b is a surface of the intermediate plate 120 facing the lower plate 110. The second manifold 132 is a space formed from the first surface 120a to the second surface 120b. Although not shown in the drawings, the second manifold 132 is connected to a second coating solution supply chamber provided outside with a supply pipe and is supplied with the second coating solution 60. When the second coating solution 60 is supplied from the external source along the supply pipe, and the second manifold 132 is fully filled with the second coating solution 60, the flow of the second coating solution 60 is guided along the upper slot 102 in communication with the second manifold 132 and comes out of the upper exit port 102a.

The upper slot 102 and the lower slot 101 form a predetermined angle, and the angle may be approximately 30° to 60°. The upper slot 102 and the lower slot 101 may intersect at one point, and the upper exit port 102a and the lower exit port 101a may be provided near the intersection point. Accordingly, the locations at which the first coating solution 50 and the second coating solution 60 emerge may converge onto approximately one point.

Meanwhile, an angle θ between the first surface 120a of the intermediate plate 120 facing the upper plate 130 and the second surface 120b of the intermediate plate 120 facing the lower plate 110 is preferably in the range in which a turbulence is not formed immediately after the active material slurry issuing through the upper exit port 102a and the active material slurry issuing through the lower exit port 101a emerge out at the same time. When the angle θ is too small, the intermediate plate 120 is too thin and very vulnerable to deformation and torsion.

According to the dual slot die coater 100 having the above-described configuration, a rotatable coating roll 200 is positioned on the front side of the dual slot die coater 100, and the dual slot die coater 100 may perform extrusion coating of the active material slurry through at least one of the lower slot 101 or the upper slot 102 while moving the substrate 300 to be coated by rotation of the coating roll 200. When the lower slot 101 and the upper slot 102 are used at the same time, the substrate 300 may be coated in a double layer by continuously contacting the first coating solution 50 and the second coating solution 60 with the surface of the substrate 300. Alternatively, pattern coating may be intermittently formed on the substrate 300 by carrying out the supply and stop of the first coating solution 50 and the supply and stop of the second coating solution 60 in an alternating manner.

Here, the dual slot die coater includes a block 140 which can be separated from or coupled to the plate members 110, 120, 130 or integrally formed with at least one of the plate members 110, 120, 130 on the rear surfaces 110c, 120c, 130c of the plate members 110, 120, 130 opposite the front end. In this embodiment, the block 140 extends from the lower plate 1140 to the upper plate 130, the intermediate plate 120 and the lower plate 110 are fixed by the block 140, and the length of the upper plate 130 is shorter than the length of the intermediate plate 120 and the length of the lower plate 110.

The block 140 has an approximately cuboidal plate structure. This simple block shape does not make processing complex, and allows precise processing. Additionally, in the same way as the plate members 110, 120, 130, also in the block 140, since corners at which sides meet are right-angled, a right angle portion in cross section exists, and a vertical or horizontal plane may be used as a reference plane, and thus it is easy to manufacture or handle and it is possible to ensure precision. Additionally, when the lower plate 110, the intermediate plate 120 and the upper plate 130 are combined together and the block 140 is connected thereto, their facing portions may support each other with high surface contact, and thus it is very good to fix by fastening and maintain.

As the first bolt 150 passes through the block 140, the bolt leg of the first bolt 150 faces the rear surface 130c of the upper plate 130. The first bolt 150 may be fastened with the block 140. To this end, the block 140 may have screw threads therein. The first bolt 150 pushes the upper plate 130 from the block 140. The first bolt 150 may be a high strength bolt. Thus, a thermally treated flat washer may be placed, or a flanged bolt may be used for the first bolt 150. The front end of the first bolt 150 may be a flat point, a concave tip or a nose tip. The first bolt 150 may not be directly connected to the upper plate 130. When the first bolt 150 is rotated in a direction, for example, the first bolt 150 is tightened, the bolt leg moves forward to the upper plate 130. When the first bolt 150 is continuously rotated in the direction even after the bolt leg touches the rear surface 130c of the upper plate 130, the upper plate 130 is moved forward by the pushing force and spaced apart from the block 140. When the first bolt 150 is rotated in the opposite direction, for example, the first bolt 150 is loosened, the upper plate 130 stays still and only the first bolt 150 is moved rearward, and the bolt leg and the rear surface 130c of the upper plate 130 are spaced apart from each other.

As the second bolt 160 passes through the block 140, the second bolt 160 is connected to the rear surface 130c of the upper plate 130. The second bolt 160 may be fastened with the block 140. To this end, the block 140 may have screw threads therein. The first bolt 150 and the second bolt 160 are parallel to each other. The second bolt 160 pulls the upper plate 130 toward the block 140. The second bolt 160 is directly or indirectly connected to the upper plate 130, and the second bolt 160 and the upper plate 130 move back and forth together. In the illustrated example, the second bolt 160 is connected to the upper plate 130 by fastening the second bolt 160 to the screw threads formed on the inner side of the upper plate 130. Taking connection to the upper plate 130 into account, the second bolt 160 may be longer than the first bolt 150. When the second bolt 160 is rotated in a direction, that is to say, the second bolt 160 is tightened, the connected upper plate 130 is pulled toward the block 140 and moved back.

Preferably, at least two first bolts 150 and at least two second bolts 160 are provided on the rear surface 130c of the upper plate 130 in the widthwise direction of the upper plate 130, respectively. Accordingly, it is possible to move the upper plate 130 back and forth in the widthwise direction without deviation and control the widthwise coating gap deviation.

Specifically, the method for adjusting the coating gap by adjusting the position of the upper plate 130 using the first bolt 150 and the second bolt 160 is as follows.

To move the upper plate 130 forward, first, the second bolt 160 is loosened. Accordingly, the second bolt 160 may form a necessary spacing when moving the upper plate 130 forward using the first bolt 150. Subsequently, the first bolt 150 is tightened to move the upper plate 130 forward. That is, the upper plate 13 is pushed. When adjustment to a desired location is completed, the second bolt 160 is tightened. The location adjusted upper plate 130 is fixed.

On the contrary, to move the upper plate 130 rearward, first, the first bolt 150 is loosened. Accordingly, the first bolt 150 may form a necessary spacing when moving back the upper plate 130 connected to the second bolt 160 using the second bolt 160. The second bolt 160 is tightened to move back the upper plate 130. That is, the upper plate 130 is pulled. When adjustment to a desired location is completed, the first bolt 150 is tightened. The location fixed upper plate 130 is fixed.

As described above, the first bolt 150 may move the upper plate 130 forward when it rotates. The second bolt 160 may move the upper plate 130 connected to the second bolt back 160 when it rotates. The first bolt 150 may form a necessary spacing when moving the upper plate 130 connected to the second bolt 160 back using the second bolt 160. The second bolt 160 may form a necessary spacing when moving the upper plate 130 forward using the first bolt 150.

Accordingly, using the first bolt 150 and the second bolt 160, a step may be formed between the rear surfaces 110c, 120c, 130c by moving the rear surface 130c of the upper plate 130 forward from the block 140 with respect to the rear surface 120c of the intermediate plate 120 and the rear surface 110c of the lower plate 110 fixed to the block 140.

The size of the step may be adjusted using the rotation of the first bolt 150 and the second bolt 160. The step determines the position of the upper die lip 131 which is the front end of the upper plate 130 and the position of the intermediate die lip 121 which is the front end of the intermediate plate 120, and thus affects the coating gap. Accordingly, the coating gap is adjusted through the size adjustment of the step.

When the pitch of the first bolt 150 and the second bolt 160 is small, the distance of motion in rotation is small. When the pitch of the first bolt 150 and the second bolt 160 is large, the distance of motion in rotation is large. The first bolt 150 and the second bolt 160 may have the same or different pitches. The pitch is the interval between adjacent screw threads.

The first bolt 150 and the second bolt 160 may be selected based on the mechanical properties defined according to the required strength (tensile strength). The strength varies depending on the material, and for example, the use of SUS304 may provide the tensile strength of 700 N/mm$^2$. Further considering corrosion resistance, a suitable material for the properties may be selected.

The first bolt 150 and the second bolt 160 may employ a suitable size according to the bolt tensile force necessary for the corresponding fastening location. The bolt tensile force is a value obtained by multiplying the tensile strength of the bolt by the effective cross-sectional area of the bolt, and the effective cross-sectional area of the bolt changes depending on the shape of the threads (calculated by those skilled in the art, considering screw inner diameter which is a diameter at the furrow between threads, screw outer diameter which is a diameter at the thread and the effective diameter corresponding to a value between them). In an embodiment of the present disclosure, the first bolt 150 and the second bolt 160 may include, for example, M5~M12 bolts.

When the upper plate 130 and the intermediate plate 120 are fixed and combined into one by the construction of the fixing block 140, and the upper plate 130 slides toward the substrate 300 with respect to the intermediate plate 120 at the interface between the upper plate 130 and the intermediate plate 120, i.e., the first surface 120a of the intermediate plate 120 facing the upper plate 130 and the surface 130b of the upper plate 130 facing the first surface 120a through the rotation of the first bolt 150 and the second bolt 160. Accordingly, the relative position of the upper exit port 102a and the lower exit port 101a may be adjusted, and the coating gap is determined accordingly. As opposed to the conventional art, the coating gap can be easily adjusted through the rotation of the first bolt 150 and the second bolt 160. Accordingly, it is possible to greatly reduce the inconvenience of having to dissemble the plate members 130, 120, 110 and adjust the position in order to adjust the coating gap.

This embodiment shows that the length of the upper plate 130 (the horizontal distance from the rear surface 130c to the upper die lip 131) is shorter than the length of the intermediate plate 120 and the length of the lower plate 110 by way of illustration. In this state, when the step is formed in the upper plate 130 relative to the intermediate plate 120 as shown in FIG. 3, the lower die lip 111, the intermediate die lip 121 and the upper die lip 131 may be disposed on the same straight line. In this case, it is possible to achieve various film coating by moving the entire dual slot die coater 100 back and forth with respect to the substrate 300.

When the length of the upper plate 130 is equal to the length of the intermediate plate 120 and the length of the lower plate 110, the upper die lip 131 may move further forward relative to the substrate 300 than the lower die lip 111 and the intermediate die lip 121. Accordingly, the step may be formed at the front side of the plate members 110, 120, 130. That is, the step is formed between the upper exit port 102a and the lower exit port 101a.

When the step is formed between the lower exit port 101a and the upper exit port 102a, the lower exit port 101a and the upper exit port 102a are spaced apart from each other along the horizontal direction, and thus there is no risk that the second coating solution 60 issuing from the upper exit port 102a may enter the lower exit port 101a, or the first coating solution 50 issuing from the lower exit port 101a may enter the upper exit port 102a.

That is, there is no risk that the coating solution issuing through the lower exit port 101a or the upper exit port 102a is blocked by the surface that forms the step between the lower exit port 101a and the upper exit port 102a and enters the other exit port, thereby performing a more smooth multi-layer active material coating process.

According to this embodiment described above, the upper plate 130 and the intermediate plate 120 are spaced apart from each other using the first bolt 150 and the second bolt 160. As described above, the dual slot die coater 100 of the present disclosure is characterized in that the first bolt 150 and the second bolt 160 are simultaneously connected to one plate member, which in turn is spaced apart from the other plate member that is not connected to the first bolt 150 and the second bolt 160.

According to this embodiment, it is possible to form the distance between the upper die lip 131 and the substrate 300, i.e., the coating gap as desired and adjust to easily change it, and always maintain it by immediately adjusting it even when a change occurs during the process. Since the intermediate plate 120 and the lower plate 110 are fixed to the block 140, once it is set, the coating gap does not change and is maintained during the process.

Accordingly, there is no need to disassemble and reassemble the plate members 130, 120, 110 which are structurally vulnerable due to their small thickness when adjusting the coating gap, and it is possible to always maintain the uniform coating gap by simple manipulation of the first bolt 150 and the second bolt 160.

According to the present disclosure, it is possible to maintain the uniform (±2%) coating gap, taking into account the deformation of the plate member by the pressure of the active material slurry coming out, thereby uniformly controlling the coating amount and the resultant coating quality. Accordingly, it is possible to obtain coated products, and in particular, electrodes for secondary batteries, with uniform quality by using the dual slot die coater having the uniform coating gap.

As described above, according to the present disclosure, it is possible to maintain the coating gap once it is set, even when the delivery pressure of the active material slurry increases. Accordingly, it is possible to ensure coating workability and reproducibility.

Using the dual slot die coater, it is possible to uniformly form a coating layer, and in particular, an active material layer, to a desired thickness, and preferably, it is possible to simultaneously coat two types of electrode active material slurries, thereby improving the performance and productivity.

In particular, when the dual slot die coater 100 includes a plurality of first bolts 150 and a plurality of second bolts 160 in the widthwise direction thereof, it is possible to achieve precise control without widthwise coating gap deviation.

An appropriate range of the coating gap is set according to the type of the active material slurry. The present disclosure performs the process with a smaller or larger amount of rotation of the first bolt 150 and the second bolt 160 to make the step portion to have the suitable height, and thus there is no need to include each dual slot die coater dedicated to each active material slurry to use various types of active material slurries, and the dual slot die coater can be used for general purpose. Additionally, when there is dispersion in the active material slurry, it is possible to quickly respond to the dispersion by immediately adjusting the step.

As described above, using the dual slot die coater of the present disclosure, it is possible to achieve uniform coating under the high-speed or wide-scale coating condition when manufacturing electrodes of secondary batteries by coating the active material slurry on the current collector while moving the current collector.

Meanwhile, although this embodiment describes coating the coating solution in two layers or performing pattern coating by supplying the coating solution in an alternating manner, it is obvious that the present disclosure may include three or more slots to simultaneously coat in three or more layers.

Additionally, although the above-described embodiment controls the upper plate 130 to move forward or rearward by connecting the first bolt 150 and the second bolt 160 to the upper plate 130, the first bolt 150 and the second bolt 160 may be connected to the intermediate plate 120 to move the intermediate plate 120 forward or rearward. In this instance, the block 140 may be coupled to or integrally formed with the lower plate 110 and/or the upper plate 130. Likewise, the first bolt 150 and the second bolt 160 may be connected to the lower plate 110 to move the lower plate 110 forward or rearward. In this instance, the block 140 may be coupled to or integrally formed with the intermediate plate 120 and/or the upper plate 130.

Meanwhile, when the dual slot die coater 100 shown in FIG. 3 has a vertical die configuration in which the rear surfaces 110c, 120c, 130c of the lower plate 110, the intermediate plate 120 and the upper plate 130 are bottom surfaces such that the delivery direction of the active material slurry is the upward direction, the first bolt 150 and the second bolt 160 are used to push or pull the upper plate 130. The vertical die configuration corresponds to a case in which the X direction or the delivery direction of the active material slurry is placed in a direction that is opposite to the direction of gravity in FIG. 3.

In this instance, the first bolt 150 that touches the upper plate 130 may have a larger tensile strength than the second bolt 160 to support the load of the upper plate 130 better. For example, the first bolt 150 may be made of a material having a larger tensile strength than the second bolt 160. Alternatively, the effective cross-sectional area of the first bolt 150 may be larger than that of the second bolt 160.

An appropriate range of the coating gap is set according to the type of the active material slurry. In the production process, different types of active material slurries, not one type of active material slurry, are used to produce various types of products. To use various types of active material slurries, it is difficult to purchase each dual slot die coater dedicated to each active material slurry. Accordingly, a type of active material slurry is coated using one dual slot die coater, and after the coating is completed, a different type of active material slurry is coated using the dual slot die coater, and at that time, it is necessary to change the previously set coating gap. Moreover, since it is difficult to always homogeneously prepare even the same type of active material slurry, there is dispersion in properties depending on when the slurry is prepared, so it is necessary to respond to the dispersion, and as the coating is performed faster, the coating quality deviation increases due to the dispersion of the properties of the active material slurry, and accordingly the coating gap control is more important.

When the dual slot die coater 100 shown in FIG. 3 is constructed as a vertical die, the coating gap may be appropriately adjusted by pushing or pulling the upper plate 130 using the first bolt 150 and the second bolt 160. It is easy to adjust the coating gap and it is possible to control the widthwise coating gap. It is possible to maintain the uniform (±2%) coating gap, taking into account the deformation of the die block by the pressure of the active material slurry coming out, thereby uniformly controlling the coating amount and the resultant coating quality. Accordingly, it is possible to obtain coated products, and in particular, electrodes for secondary batteries with uniform quality by using the dual slot die coater according to the present disclosure capable of achieving the uniform coating gap.

Subsequently, other embodiments of the present disclosure will be described with reference to FIGS. 6 and 7. The same reference numerals as the above-described embodiment denote the same elements, and overlapping descriptions of the same elements are omitted, and difference(s) from the above-described embodiment is mainly described.

Figure 6:
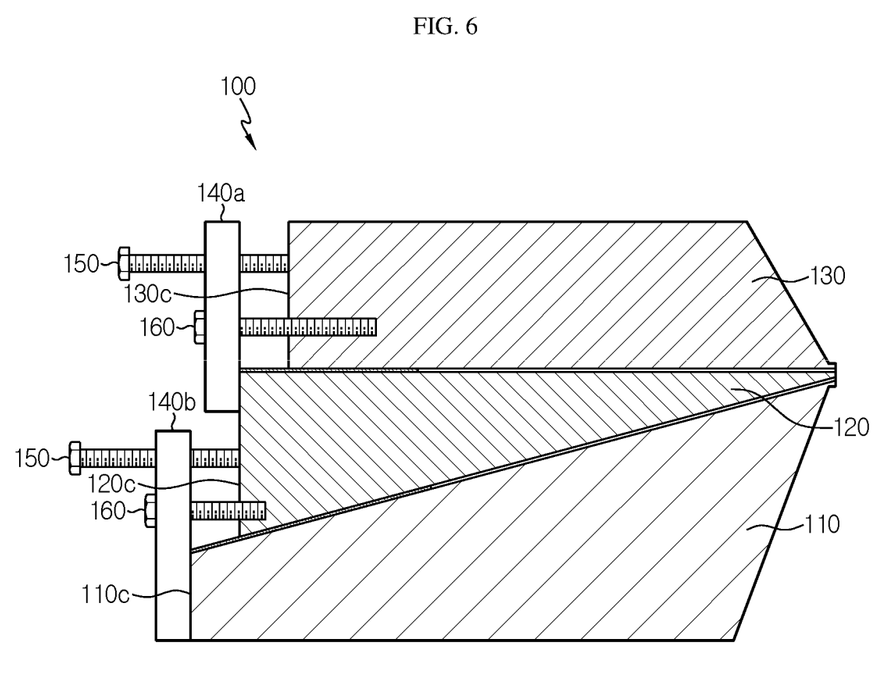
FIG. 6 is a schematic cross-sectional view of a dual slot die coater according to another embodiment of the present disclosure.

The dual slot die coater shown in FIG. 6 includes the first bolt 150 and the second bolt 160 are connected to not only the upper plate 130 but also the intermediate plate 120 to move back and forth. Here, for separate control of the upper plate 130 and the intermediate plate 120, the block 140 is divided into two, a first block 140a and a second block 140b.

The first block 140a extends from the intermediate plate 120 to the upper plate 130, and in particular, is connected and fixed to the intermediate plate 120. The second block 140b extends from the lower plate 110 to the intermediate plate 120, and in particular, is connected and fixed to the lower plate 110.

As described above, the first bolt 150 and the second bolt 160 connected to the upper plate 130 pass through the first block 140a, and the first bolt 150 and the second bolt 160 connected to the intermediate plate 120 pass through the second block 140b. As in the previous embodiment, only one of the plate members 110, 120, 130 may be controlled through forward and backward movement, and as in this embodiment, two of the plate members 110, 120, 130 may be each independently controlled through forward and backward movement.

In this embodiment, the length of the lower plate 110 is longer than the length of the intermediate plate 120 and the upper plate 130. In this state, when a step is formed in the upper plate 130 and the intermediate plate 120 with respect to the lower plate 110 as shown in FIG. 6, the lower die lip 111, the intermediate die lip 121 and the upper die lip 131 may be disposed on the same straight line. The upper die lip 131 may be disposed closest to the substrate 300.

In the above-described embodiment, the intermediate plate 120 includes one plate member. In an embodiment as described below, the intermediate plate 120 includes two plate members, thereby adaptively adjusting the relative position of the upper exit port 102a and the lower exit port 101a more easily.

Figure 7:
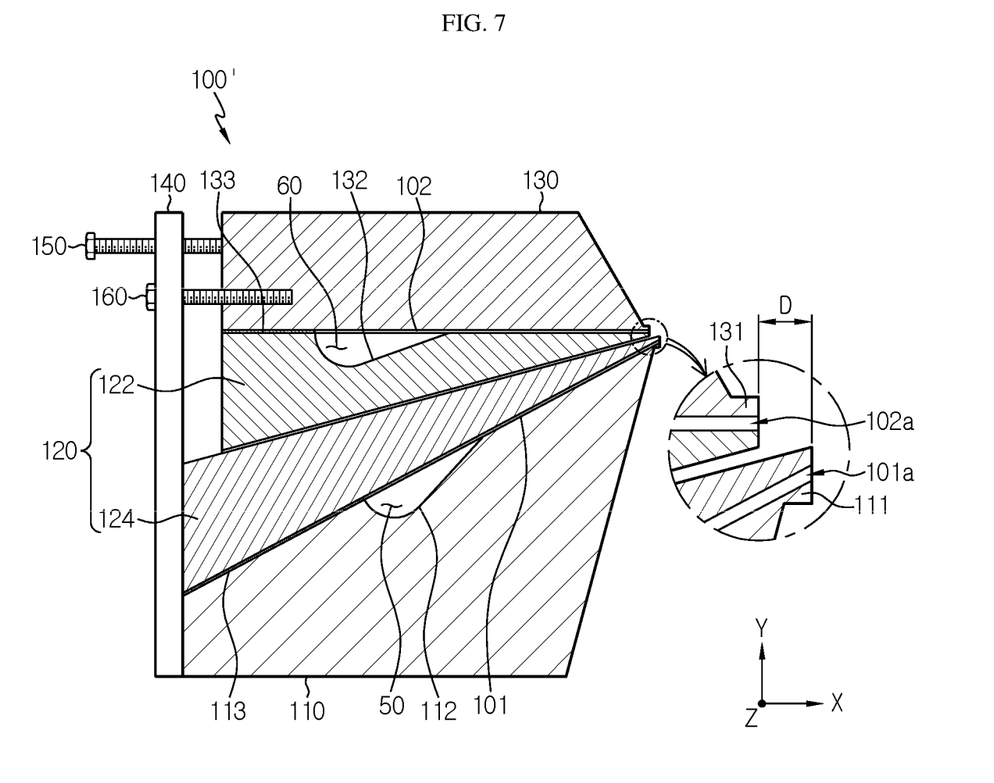
FIG. 7 is a schematic cross-sectional view of a dual slot die coater according to still another embodiment of the present disclosure.

To this end, the dual slot die coater 100' according to another embodiment of the present disclosure shown in FIG. 7 includes the intermediate plate 120 including an intermediate upper plate 122 and an intermediate lower plate 124, and the intermediate upper plate 122 and the intermediate lower plate 124 are provided in contact with each other in the vertical direction and make a relative movement by sliding along the contact surface. Additionally, the intermediate upper plate 122 is fixed and coupled to the upper plate 130 by bolt coupling, and the intermediate lower plate 124 is fixed and coupled to the lower plate 110 by bolt coupling. Accordingly, the intermediate upper plate 122 and the upper plate 130 may move together, and the intermediate lower plate 124 and the lower plate 110 may move together.

The dual slot die coater 100' may include the two exit ports 101a, 102a disposed at front and rear positions, spaced apart from each other along the horizontal direction, if necessary. When the first bolt 150 and the second bolt 160 are connected to only the upper plate 130, the upper plate 130 and the intermediate upper plate 122 may be allowed to move together. Thus, a relative movement between the upper plate 130 and the lower plate 110 may be made.

For example, a step is formed between the lower exit port 101a and the upper exit port 102a by moving the upper plate 130 by a predetermined distance in the rearward or forward direction opposite to the delivery direction of the coating solutions 50, 60 along a sliding surface without moving the lower plate 110 and the intermediate lower plate 124 coupled to the lower plate 110. Here, the sliding surface refers to a facing surface of the intermediate upper plate 122 and the intermediate lower plate 124.

The width D of the step may be determined in the range of approximately a few hundreds of micrometers to a few millimeters, and may be determined based on the properties and viscosity of the first coating solution 50 and the second coating solution 60 formed on the substrate 300 or the desired thickness for each layer on the substrate 300. For example, as the thickness of the coating layer that will be formed on the substrate 300 increases, the width D of the step may increase.

As the lower exit port 101a and the upper exit port 102a are spaced apart from each other along the horizontal direction, there is no risk that the second coating solution 60 issuing from the upper exit port 102a may enter the lower exit port 101a, or the first coating solution 50 issuing from the lower exit port 101a may enter the upper exit port 102a.

That is, there is no risk that the coating solution issuing through the lower exit port 101a or the upper exit port 102a may be blocked by the surface that forms the step between the lower exit port 101a and the upper exit port 102a and enters the other exit port, thereby performing a smooth multi-layer active material coating process.

When it is necessary to change the relative position between the lower exit port 101a and the upper exit port 102a, the dual slot die coater 100' according to still another embodiment of the present disclosure may simply adjust by the sliding movement of the lower plate 110 and/or the upper plate 130, and it is not needed to disassemble and reassemble each plate member 110, 120, 130, thereby significantly improving workability.

As described above, according to another aspect of the present disclosure, it is possible to easily adjust the positions of the upper exit port and the lower exit port by the relative movement of the upper plate and the lower plate according to the coating process conditions, thereby improving workability of dual slot coating.

While the present disclosure has been described with respect to a limited number of embodiments and drawings, the present disclosure is not limited thereto, and it will be apparent to those skilled in the art that a variety of changes and modifications may be made thereto within the technical aspects of the present disclosure and the appended claims and their equivalent scope

What is claimed is:

1. A dual slot die coater, comprising:
    a plate member including a first outer plate, an intermediate plate positioned adjacent to the first outer plate, and a second outer plate positioned adjacent to the intermediate plate, wherein a first slot is formed between the intermediate plate and the first outer plate, and a second slot is formed between the second outer plate and the intermediate plate;
    a block provided on a first surface of the plate member, wherein the block is configured to be separated from or coupled to the plate member, or integrally formed with at least one of the first outer plate, the intermediate plate, and the second outer plate;
    a first bolt configured to push at least one of the first outer plate, the intermediate plate, and the second outer plate from the block as the first bolt passes through the block; and
    a second bolt configured to pull the at least one of the first outer plate, the intermediate plate, and the second outer plate toward the block as the second bolt passes through the block.

2. The dual slot die coater according to claim 1, wherein at least two first bolts and at least two second bolts are provided on the first surface of the plate member in a widthwise direction of the plate member, respectively.

3. The dual slot die coater according to claim 1, wherein the block extends from the first outer plate to the second outer plate, and the intermediate plate and the first outer plate are fixed by the block, the first bolt pushes the second outer plate and the second bolt pulls the second outer plate.

4. The dual slot die coater according to claim 3, wherein a length of the second outer plate is shorter than a length of the intermediate plate and a length of the first outer plate.

5. The dual slot die coater according to claim 1, wherein the block includes a first block extending from the intermediate plate to the second outer plate and a second block extending from the first outer plate to the intermediate plate, the first bolt which pushes the second outer plate and the second bolt which pulls the second outer plate pass through the first block, and the first bolt which pushes the intermediate plate and the second bolt which pulls the intermediate plate pass through the second block.

6. The dual slot die coater according to claim 5, wherein the first block is fixed to the intermediate plate, and the second block is fixed to the first outer plate.

7. The dual slot die coater according to claim 5, wherein a length of the first outer plate is longer than a length of the intermediate plate and a length of the second outer plate.

8. The dual slot die coater according to claim 1, wherein the first outer plate, the intermediate plate and the second outer plate have a first outer die lip, an intermediate die lip and an second outer die lip, each forming a front end, respectively, a first exit port in communication with the first slot is formed between the first outer die lip and the intermediate die lip, and a second exit port in communication with the second slot is formed between the intermediate die lip and the second outer die lip, the dual slot die coater is configured to perform extrusion coating of an active material slurry on a surface of a continuously moving substrate through at least one of the first slot or the second slot, and a step is formed between the first exit port and the second exit port.

9. The dual slot die coater according to claim 1, wherein the intermediate plate includes a first intermediate plate and a second intermediate plate provided in contact with each other, wherein the first intermediate plate and the second intermediate plate are configured to slide relative to each other along a contact surface, and the first intermediate plate is fixed and coupled to the first outer plate, and the second intermediate plate is fixed and coupled to the second outer plate.

10. The dual slot die coater according to claim 1, wherein the first bolt is fastened to the block such that a bolt leg faces a first surface of the second outer plate, when the first bolt is rotated in a first rotational direction, the bolt leg moves in a first linear direction relative to the second outer plate and the second outer plate is moved in the first linear direction and spaced apart from the block by a pushing force of the first bolt, and when the first bolt is rotated in a second rotational direction opposite the first rotational direction, the first bolt moves in a second linear direction opposite the first linear direction and the bolt leg is spaced apart from the first surface of the second outer plate.

11. The dual slot die coater according to claim 1, wherein the second bolt is fastened to the block and the second outer plate, and when the second bolt is rotated in a rotational direction, the second outer plate is pulled toward the block and moved in a linear direction.

12. The dual slot die coater according to claim 1, wherein the first bolt moves the second outer plate in a first linear direction as it rotates, to form a necessary spacing when moving the second outer plate in a second linear direction opposite the first linear direction using the second bolt, and the second bolt moves the second outer plate in the second linear direction as it rotates, to form a necessary spacing when moving the second outer plate in the first linear direction using the first bolt.

13. The dual slot die coater according to claim 1, wherein a tensile force of the first bolt is larger than a tensile force of the second bolt.

14. The dual slot die coater according to claim 1, wherein the first outer plate, the intermediate plate and the second outer plate have a first outer die lip, an intermediate die lip and a second outer die lip, each forming a front end, respectively, a first exit port in communication with the first slot is formed between the first outer die lip and the intermediate die lip, and a second exit port in communication with the second slot is formed between the intermediate die lip and the second outer die lip, the dual slot die coater is configured to perform extrusion coating of an active material slurry on a surface of a continuously moving substrate through at least one of the first slot or the second slot, and the dual slot die coater has a vertical die configuration in which the first surfaces of the plate member is a bottom surface such that a delivery direction of the active material slurry is opposite to a direction of gravity.

* * * * *